Figure 1:
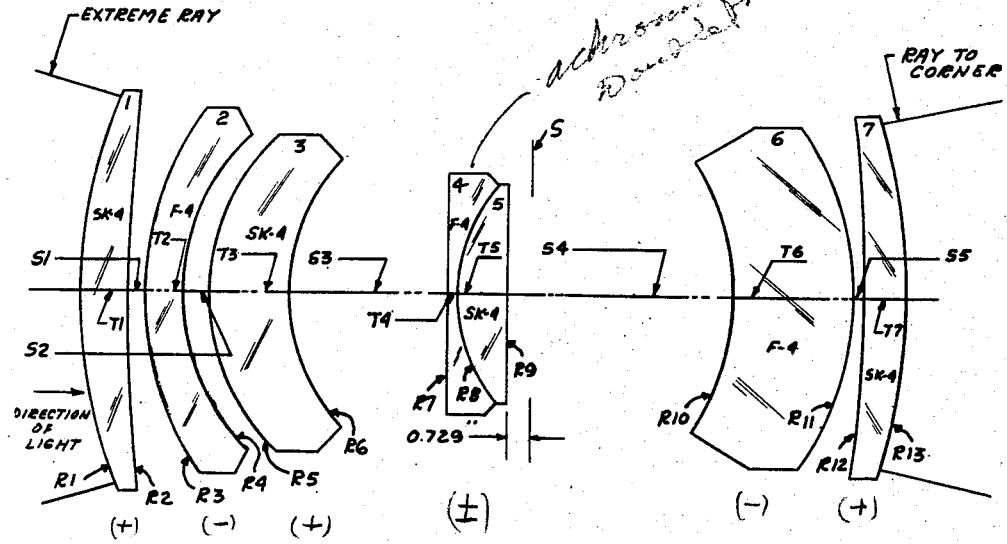

United States Patent Office 2,872,845
Patented Feb. 10, 1959

2,872,845

36-INCH F/3.7 LENS

James G. Baker, Winchester, Mass., assignor to the United States of America as represented by the Secretary of the Air Force Application April 5, 1956, Serial No. 576,508

10 Claims. (Cl. 88—57)

This invention relates to optical objectives for aerial photography, which are corrected for coma, astigmatism, field curvature, distortion, chromatic aberration and both axial and oblique spherical aberrations. This invention is concerned specifically with a new kind of photographic objective that is especially intended for night aerial photography and is characterized not only by improved correction for all of the classical aberrations but also for those three aberrations most likely to cause inferior pictures. These three aberrations are higher order astigmatism, field curvature, and oblique spherical aberration.

Night aerial photography nowadays requires lenses of increased focal length in order to permit adequate scale from the high altitudes which are made mandatory by current military conditions. Along with the increase in focal length, it is necessary to maintain adequate lens speed in order to obtain sufficient photographic exposure from the diluted flash bomb radiation at these higher altitudes. Naturally there are certain limitations in lens speed for very large lenses and the designer is forced to seek the optimum compromise among many conflicting types of aberrations. The standard Seidel aberrations of spherical aberration, coma, astigmatism, field curvature and distortion represent only the first approximation to all of the many aberrations that can become significant in so large a lens as a 36-inch $f/3.7$ for a 9 x 18 flat field. A lens form must be chosen with considerable care in order to provide physical parameters capable of satisfying a wide variety of complicated conditions. It is obvious that no standard lens design of an aerial objective will prove adequate by simple scaling techniques alone. It is necessary for the designer to start from basic principles and to add enough elements to the optical system to achieve the desired purpose.

Most aerial photography is carried on in the yellow, red, and infra-red portions of the spectrum. In recent years night aerial photography has been accomplished in the red and infra-red portions of the spectrum where a filter can be used to filter out the haze from the visual portion of the spectrum. The haze condition is of utmost importance in night photography inasmuch as the flash bomb illuminates the haze directly beneath the airplane. It is very important therefore that radiation should penetrate this haze to the ground and return with a maximum of contrast on the photographic film. It is well known that a resort to the red and infra-red portions of the spectrum will bring about greater haze penetration, provided this haze arises from dust and not from water vapor. In the presence of mist not very much can be done by filter techniques to improve the contrast of night aerial photography and as a result the picture quality is bound to be lower than when good weather conditions prevail. In the presence of dust, such as in desert regions of the world, night aerial photography should be better in the red and infra-red part of the spectrum than in the visual.

The subject lens of this application has been designed for infra-red region of the spectrum but the principles involved can be extended very readily by those skilled in the art to other portions of the spectrum. The particular adaptation to any assigned spectral region is simply a question of proper achromatization and rather moderate changes in lens powers or positions will bring about a correction for the green or even blue as readily as for the infra-red.

Fig. 1 shows a schematic view of the type of optical system designed for the above described purposes. The lens system is substantially symmetrical and consists essentially of seven elements arranged in the form of five axially aligned components. These components are in order: the isolated front lens, the second and third lenses viewed as one component, the cemented pair in the central air space, the thick lens in the second half of the system and finally the isolated last positive lens. A stop S is positioned centrally in the lens system. It is seen that this design is related distantly to the classical Biotar formula, the type of lens system normally employing four components without a fifth in the central air space.

The normal Biotar has a comparatively small central air space and the two meniscus components are individually constructed of cemented doublets. The ordinary Biotar is afflicted with oblique spherical aberration and quite frequently with higher order tangential astigmatism. The Biotar cannot be scaled up to a 36-inch focal length if designed in its usual form because of the excessive oblique spherical aberration. This aberration produces very considerable flare around the images off axis and materially reduces the microscopic contrast of the aerial images. For example, at $f/3.7$ the average Biotar in a 36-inch focal length at a point 20 degrees off axis in the absence of much vignetting may produce an image flare measuring a number of millimeters across. Although the core of the image may conceivably still be sharply defined, there is not enough percentage of the total light in this core to give satisfactory contrast to the picture. Moreover, the tendency towards tangential astigmatism destroys even the core of the image and reduces the picture quality still more.

Therefore, in seeking out a lens system capable of producing an area weighted average resolution of 30 lines to the millimeter on Super XX or on infra-red film, it has been necessary to introduce a more complicated construction. Fig. 1 shows the use of a cemented doublet in the central air space for correcting the chromatic aberration of the system in a symmetrical way. This same doublet is of such thickness that the tangential astigmatism of the fifth and higher orders is favorably corrected thereby. As seen in Fig. 1 this thickness is approximately two inches.

The construction of the second component of the system, namely, the strong negative meniscus of flint glass and the effectively negative maniscus of crown glass is specially interesting. The lower rim rays could have been corrected by a cemented doublet combination leading from a low index flint on the left to a high index crown on the right, with the center of curvature of the cemented surface lying in front of the central stop of the system. This construction, however, is limited in its achromatizing ability by a lack of an adequate array of glass types. That is, the dispersion of the low index negative meniscus in such a cemented combination is too low to bring about color correction of a fast system. Moreover, the use of a cemented surface with a widely different V-value brings about a chromatic spherical aberration that detracts from the effective performance of the system in other regions of the spectrum. Both of these objections can be overcome or at least greatly diminished by employing an air-spaced construction between the second and third elements comprising the second component. This air space is extremely strong in power in terms of off-axis aberrations, primarily because once again the center curvature of either surface lies to the left of the central stop. Therefore, the lower rim rays are increasingly deviated and the designer gains control over a correcting means for oblique spherical correction of the lower rim rays. The color spread caused by the refraction from the concave air surface of the second element so increases the height of the ray on the convex surface of the following crown in the shorter wavelengths that chromatic spherical aberration is greatly reduced. It is noted that the radius of curvature of the crown glass is shorter than for the neighboring concave surface of the flint glass by an amount sufficient to refract the lower rim ray strongly in the outward direction in the field. This type of refraction compensates for the normal tendency of the tenth surface of this system to deviate the lower rim rays inwardly. By many calculations a balance can be achieved in this respect that produces a favorable overall correction.

In order to provide a lens of greater utility, the color aberrations are corrected for best performance at approximately 7,000 angstroms. This means that the system can be used with good results with ordinary red light by a filter combination with Super XX film or its equivalent. The system can also be used with infra-red film and either red or infra-red filter as circumstances dictate. This type of color correction seems wiser than one designed simply for the infra-red range alone where the film at the present time is incapable of yielding high performance. Moreover, the photographic emulsion is insensitive to the full considerations applied in the case of visual optics and hence it is better to obtain a wider spectral coverage for somewhat lowered resolution than to attempt peak performance where the photographic emulsion prevents success.

For the above reasons, the minimum focus for longitudinal chromatic aberration for the 0.7 zone of the entrance pupil lies approximately at 7,000 angstroms with the entire spectral range contemplated extending from 5,893 to 9,000 angstroms. Similarly, the lateral color is corrected for approximately 7,000, though precise calculations indicate a tendency in the outer part of a 45-degree total field to have the best color correction move farther into the infra-red to approximately 7,600 angstroms. The spherical aberration at 7,682 is corrected approximately for the 0.9 zone combined with the paraxial focus. It is known from experience and calculations that this type of correction yields the optimum aerial performance.

The distortion of the system is quite adequately minimized. At the edge of a 45-degree total field, namely, 22.5° off axis, the distortion amounts to less than 0.2 of one percent. The correction for radial and tangential field curvatures is exceptionally good over the contemplated 9 x 18-inch format. The central pencil through the entrance pupil shows a tangential focus that is extremely flat out to 80 percent of the diagonal and in fact at this point joins the peraxial focal plane once again. The total error between the optical axis and this 80 percent field angle amounts to less than 0.2 of a millimeter and is on the lens side of the paraxial focal plane. In the outer part of the field, between 80 percent and 100 percent of the half-diagonal, this limiting tangential focus becomes short to the extent of 0.5 millimeters in the extreme corner of the format. The radial focal surface first becomes short in the intermediate fields due to the positive Petzval residual but reaches a maximum of —0.5 millimeters at the 80 percent zone and then begins to curve back towards the paraxial focal plane. The field therefore may be considered unusually flat because it is known from much experience that an $f/3.7$ lens will have a depth of focus of approximately plus or minus 0.2 of a millimeter at a resolution level of 30 lines to the millimeter particularly where the image is not critically sharp by visual standards.

The effective focus over the full aperture of the light passing through the system must be considered and not over just the central pencils. When the calculations are carried through, it is found that the radial focal surface crosses the paraxial focal plane approximately at the 70 percent zone of the field and in the intermediate field is flat within —0.1 millimeters. The radial focal surface tends in the outer part of the field to focus long to the extent of approximately 0.3 millimeters at the extreme corner. The tangential focal surface focuses long in the intermediate field, passes through a node at approximately the 90 percent zone and then focuses short at the extreme corner. The amplitude in the intermediate field reaches 0.3 millimeters at the 70 percent zone and approximately —0.3 millimeters at the full corner.

Therefore, the mean focal surface of this 36-inch lens is essentially flat over a full 9 x 18 inch format for the mean aperture and on this flat plane will give both a satisfactory depth of focus and a satisfactory microscopic contrast.

The peak performance of a lens of this kind is not so good as if more attention were paid to the ultimate correction of oblique spherical aberration. However, to effect full correction for oblique spherical aberration would require more complicated construction which in view of the already large elements required would be a needless complication. It will be quite some time before the quality of aerial photographs for night photography will reach a level of 30 lines to the millimeter. Therefore, it seems unwise to have too complicated a construction that would yield still better laboratory performance unrealizable in the air. The important thing is that the core of the image everywhere in the field is sharply defined and free from astigmatism. The out-of-focus light arising from the oblique spherical aberration is not sufficient to detract measurably from the contrast produced from the core of the image and instead helps to take the photograph off of the toe of the characteristic curve onto the straight line portion. To this extent, the oblique spherical aberration will not affect picture quality noticeably. It is anticipated that this lens will give night aerial pictures of exceptionally good quality, comparing favorably with performance of the shorter focal length lenses, even on a linear basis. The essential novelty in this type of lens system arises from the use of the air space in the second component and from the use of the cemented doublet in the central air space. Therefore, the scope of this invention can be defined by claims based upon limits on the air space separation, the adjacent curvatures, and the portion and power of the central doublet. In the case of the air space in the first negative meniscus component, that is, the second component of the entire system, it can be seen that if the air space were altogether closed that no optical effects would result. The indices of the two elements of the component are so nearly alike that no appreciable ray deviation would occur at the vanishingly small air space. It can be seen that an upper limit on the air space here employed would be brought about by an excessive deviation at the concave air surface of the first negative element. The divergence produced in the rays as a whole would cause the system to get completely out of control by the introduction of strong coma. Therefore, a useful range on this air space can be assigned extending from 0.002 to 0.020 in terms of the focal length of the system. That is, the air space will extend from 0.2 to 2.0 percent of the focal length in terms of the axial separation of the second and third elements.

Similarly, a range can be imposed on the radii of the adjacent refracting surfaces $R_4$ and $R_5$ around this air space. It is important that the center of curvature of either surface lie in front of the central stop in order to effect an optical correction in the desired way. The center of curvature of the surface $R_5$ of the third element lies slightly closer to the stop than the center of curvature of the concave side of the second element. Therefore, an upper limit for the radius of curvature of either surface can be determined by setting it equal to the distance from the vertex of the surface $R_5$ of the third element to the stop. This distance in the present example is equal to 23.5 percent of the focal length, or 0.235 F. The table in column 6 shows that the radius of $R_5$ is 0.183 F. If the radius of curvature of either the fourth or fifth surfaces were much shorter than 0.183 F, excessive coma would be introduced and the design would also become sensitive to small errors in the radii and adjustment of these surfaces. Therefore, it seems advisable that the radius of curvature of surfaces $R_4$ or $R_5$ should lie in the range from 0.15 F to 0.23 F.

The achromatizing doublet in the center (hyperchromatic within itself) can best be defined in terms of its total optical power and the radius of curvature of the cemented inner face. The location of this doublet is optically fairly well determined by the need to correct for lateral color in the system and therefore must lie somewhere near the central stop. The optical power of the central doublet must be held quite close to zero. If this doublet were decidedly positive in power, its convergence action on the light in the central air space that already is convergent would tend to so lower the refracting height in the last two elements as to reduce the optical power of the system, increase the curvatures and therefore increase the aberrations. If this lens doublet were strongly negative, the negative astigmatism so introduced would tend to require a shortening of the overall lens barrel length with resultant increase in the higher order astigmatism, and oblique spherical aberration. This is all the more true because the negative power provided to this central doublet in such a case would have to come from the adjacent concave air surfaces of the second and fourth components that would in turn be less curved around the central stop and produce still more oblique spherical aberration. The optimum state of affairs seems to be to imply a relatively thick doublet of low optical power in the central air space in order to take advantage of the dominance of the fifth order tangential astigmatism of the front surface of this doublet over the rear surface which leads a partial negative fifth order tangential astigmatism that yields the quality of correction in this respect described earlier. Accordingly, the ranges for the optical power of this element can be narrowly drawn. The thin lens power of the doublet in this example is equal to approximately plus seven percent of the power of the system as a whole. The entire range may be from —7% to +15% of the system as a whole and within the range the basic achromatizing action and astigmatizing action of this doublet can be maintained without sacrifice of other properties of the system.

Likewise, the limits on the radius of curvature of the achromatizing cemented surface can be narrowly drawn. If this surface is much steeper than that in the example, excessive chromatic aberrations would be introduced because of the considerable change in V-value across the cemented inner face. Moreover, such a steep curvature could be brought about only by insufficient difference in V-value if the system is to be achromatized fully and this circumstance would either require unequal indices in the mean color at the cemented inner face owing to the choice of glass types available or else if the indices are identical at the mean color, achromatizing action can be effected with smaller curvature anyway. If the cemented curvature is much weaker than in the example, achromatizing action could be obtained only by using a more dispersive flint glass or less dispersive crown glass, either of which would tend to produce a negative index drop across the cemented surface with a consequent drastic increase in the oblique spherical aberration of the upper rim ray. The radius of curvature of $R_8$ in the example is 0.149 F. Accordingly, a suitable range for this radius of curvature would be between 0.10 and 0.20 F.

The optical data corresponding to Fig. 1 are given below in terms of a focal length of 36 inches.

[f=36"]

| Lens | $N_d$ | V | Glass Type | Radius, inches | Thickness, inches |
|---|---|---|---|---|---|
| 1 | 1.613 | 58.6 | SK-4 | $R_1$=13.646 | $T_1$=1.529 |
|   |       |      |      | $R_2$=32.889 | $S_1$=0.146 |
| 2 | 1.617 | 36.6 | F-4  | $R_3$=9.395  | $T_2$=1.274 |
|   |       |      |      | $R_4$=6.742  | $S_2$=0.437 |
| 3 | 1.613 | 58.6 | SK-4 | $R_5$=6.609  | $T_3$=2.507 |
|   |       |      |      | $R_6$=6.483  | $S_3$=3.277 |
| 4 | 1.617 | 36.6 | F-4  | $R_7$=291.26 | $T_4$=0.437 |
|   |       |      |      | $R_8$=5.354  |             |
| 5 | 1.613 | 58.6 | SK-4 | $R_9$=Plano  | $T_5$=1.529 |
|   |       |      |      |              | $S_4$=5.643 |
|   |       |      |      | $R_{10}$=−6.742 |          |
| 6 | 1.617 | 36.6 | F-4  | $R_{11}$=−10.104 | $T_6$=3.732 |
|   |       |      |      |                  | $S_5$=0.146 |
| 7 | 1.613 | 58.6 | SK-4 | $R_{12}$=−91.02  | $T_7$=1.384 |
|   |       |      |      | $R_{13}$=−15.830 |             |

$R_1, R_2$ . . . represents the radius of curvature of the individual lens $T_1, T_2$ . . . represents the axial thickness of the successive individual elements $S_1, S_2$ . . . represents the axial air separation of the successive elements $N_d$ . . . represents the refractive index V . . . represents a dispersive index for each element In the foregoing table and in Fig. 1, the lens components are numbered from front to rear with the light assumed to come from the front of the lens system. The values in the common head $N_d$ are the refractive indices, and the values in the column headed V are related to dispersion. The radii of curvature for the surfaces marked $R_1$ to $R_{13}$ are marked plus or minus, depending on whether the surfaces are convex or concave toward the oncoming light. The axial thicknesses of the elements and the length of the air spaces between them are designed T and S, respectively, and are numbered from front to rear. In Fig. 1 light coming from the left encounters lens l at the front of the optical object. Light leaves the optical objective from the rear and through lens 7. Lenses positioned to the left of stop S are referred to as being in front of the stop and lenses positioned to the right of the stop are referred to as being in back of the stop. In summary, the lens system, see Fig. 1, includes a plurality of spaced coaxially aligned lenses alternately composed of crown and flint glass. It comprises front and rear outer simple collective components 1 and 7. These components are menisci and are positioned so their concave surfaces are opposed to each other and curved about a central stop. The negative meniscus component adjacent component 1 consists of the two spaced menisci, one a negative and the other positive. The separation of these menisci lies in a range between 0.2% and 2% of the focal length of the lens system. The radius of curvature of either adjacent surface, $R_4$ or $R_5$ of the two menisci, lies in a range between 15% and 23% of the focal range of the system. In addition, the menisci are positioned so the vertices of the adjacent surfaces $R_4$ and $R_5$ lie in front of the stop S at a distance greater than the length of the largest radius of curvature of these adjacent surfaces. An additional negative meniscus component is disposed adjacent collective component 7 at the rear of the stop S and is positioned so its concave surface opposes the concave surfaces of the above-mentioned spaced menisci. An achromatizing cemented doublet is disposed substantially adjacent the center of the lens system and is slightly in front of the stop S. This doublet has an optical power lying in the range between —7% and +15% of the power of the entire lens system and the range of the radius of curvature of the common cemented surfaces lies in a range between 10% and 20% of focal length of the system. This achromatizing center cemented doublet is sufficiently thick to correct the lens system for higher order tangential astigmatism. In the example above it is approximately two inches thick.

Having thus described the invention, what is desired to be claimed is as follows.

I claim:

1. An optical objective made of glass components throughout and corrected for coma, astigmatism, field curvature, distortion, chromatic aberration and both axial and oblique spherical aberrations comprising a substantially symmetrical lens system, said lens system including front and rear outer components of net collective effect, a central stop, a negative meniscus component for correcting lower rim rays without introducing chromatic spherical aberrations, said negative meniscus component including two spaced menisci, one negative and one positive, the separation of the menisci being within 0.2% and 2% of the focal length of the lens system, the length of either radius of curvature of the adjacent surfaces of the menisci being within 15% to 23% of the focal length of the system, said menisci positioned so that the vertices of the adjacent surfaces of said spaced menisci lie in front of the stop a distance greater than the length of the largest radius of curvature of the said adjacent surfaces, said lens system further including a centrally disposed hyperchromatic cemented doublet, said doublet having an optical power for yellow light between —7% and +15% of the optical power of the entire lens system and wherein the length of the radius of curvature of the common cemented optical surface lies in a range between 10% and 20% of the focal length of the system.

2. The invention set forth in claim 1 wherein the centrally disposed hyperchromatic doublet is adjacent to and in front of the stop, and is made sufficiently thick to correct for tangential astigmatism.

3. The invention set forth in claim 1 wherein the front and rear outer components are simple elements.

4. The invention set forth in claim 1 wherein the front and rear outer components are positive menisci having their concave surfaces in opposed position.

5. The invention set forth in claim 1 wherein the V-values of the spaced menisci of the second component are widely different and wherein the indices of refraction of the glass of the two menisci are substantially similar in which V-values are dispersion indices.

6. The invention set forth in claim 1 including an additional negative meniscus positioned to the rear of the stop, said negative meniscus having a concave surface opposed to the concave surfaces of the spaced menisci comprising the negative meniscus component in front of the stop.

7. The invention set forth in claim 1 wherein the lens system includes a plurality of spaced coaxially aligned lenses, said lenses alternately composed of crown and flint glass.

8. An optical objective made of glass components throughout and corrected for coma, astigmatism, field curvature, distortion, chromatic aberration and axial and oblique spherical aberrations, comprising an axially aligned substantially symmetrical lens system, said lens system including front and rear outer components of net collective effect, a central stop, a negative meniscus component for correcting lower rim rays without introducing chromatic spherical aberration, said negative meniscus component including two spaced menisci, one negative and the other positive, having widely different V-values and substantially similar indices of refraction, in which V values are dispersion indices, the separation between the menisci within 0.2% and 2% of the focal length of the lens system, said menisci having adjacent surfaces, the length of the radius of curvature of the adjacent surfaces of the menisci within 15% and 23% of the focal length of the system, said menisci positioned so that the vertices of the adjacent surfaces lie in front of the stop at a distance greater than the length of the largest radius of curvature of the adjacent surfaces, said lens system further including a centrally disposed hyperchromatizing cemented doublet positioned adjacent to and in front of the central stop, said cemented doublet having an optical power within —7% and +15% of the power of the lens system as a whole, said doublet having common cemented spherical surfaces therebetween, the length of the radius of the common cemented surface lying within 10% and 20% of the focal length of the lens system.

9. The invention set forth in claim 8 including an additional negative meniscus disposed at the rear of the stop and wherein the concave surface of the negative meniscus is positioned in opposition to the concave surfaces of the menisci composing the negative meniscus component.

10. An optical objective having numerical data substantially as follows:

[$f=36''$]

| Lens | $N_d$ | V | Glass Type | Radius, inches | Thickness, inches |
| --- | --- | --- | --- | --- | --- |
| 1 | 1.613 | 58.6 | SK-4 | $R_1=13.646$ | $T_1=1.529$ |
|   |       |      |      | $R_2=32.889$ | $S_1=0.146$ |
| 2 | 1.617 | 36.6 | F-4  | $R_3=9.395$  | $T_2=1.274$ |
|   |       |      |      | $R_4=6.742$  | $S_2=0.437$ |
| 3 | 1.613 | 58.6 | SK-4 | $R_5=6.609$  | $T_3=2.507$ |
|   |       |      |      | $R_6=6.483$  | $S_3=3.277$ |
| 4 | 1.617 | 36.6 | F-4  | $R_7=291.26$ | $T_4=0.437$ |
| 5 | 1.613 | 58.6 | SK-4 | $R_8=5.354$  | $T_5=1.529$ |
|   |       |      |      | $R_9=$Plano  | $S_4=5.643$ |
| 6 | 1.617 | 36.6 | F-4  | $R_{10}=-6.742$ | $T_6=3.732$ |
|   |       |      |      | $R_{11}=-10.104$ | $S_5=0.146$ |
| 7 | 1.613 | 58.6 | SK-4 | $R_{12}=-91.02$ | $T_7=1.384$ |
|   |       |      |      | $R_{13}=-15.830$ |  |

$N_d$ . . . represents the refractive index.

V . . . represents the dispersive index for each element, and

SK–4 and F–4 define types of crown glass and flint glass respectively.

References Cited in the file of this patent
FOREIGN PATENTS 1,046,483    France _____ July 8, 1953